United States Patent
Lin et al.

(10) Patent No.: US 7,953,374 B2
(45) Date of Patent: *May 31, 2011

(54) SCHEDULING METHODS AND SYSTEMS FOR WIRELESS MULTI-HOP RELAY COMMUNICATIONS

(75) Inventors: Shiang-Jiun Lin, Nantou County (TW); I-Kang Fu, Hsinchu (TW); Cheng-Kang Pai, Taipei County (TW); Wern-Ho Sheen, Chiayi County (TW)

(73) Assignee: Acer Incorporated, Taipei Hsien (TW)

( * ) Notice: Subject to any disclaimer, the term of this patent is extended or adjusted under 35 U.S.C. 154(b) by 436 days.

This patent is subject to a terminal disclaimer.

(21) Appl. No.: 12/121,749

(22) Filed: May 15, 2008

(65) Prior Publication Data
US 2008/0274746 A1 Nov. 6, 2008

Related U.S. Application Data

(63) Continuation-in-part of application No. 11/614,982, filed on Dec. 22, 2006, now Pat. No. 7,756,482.

(51) Int. Cl.
*H04B 17/00* (2006.01)
(52) U.S. Cl. .......... 455/67.13; 455/7; 455/9; 455/67.11; 370/315
(58) Field of Classification Search ................ 455/7–10, 455/14–25, 67.11, 67.13; 370/315
See application file for complete search history.

(56) References Cited

U.S. PATENT DOCUMENTS 7,756,482 B2 * 7/2010 Lin et al. ............... 455/67.13
2009/0286465 A1 * 11/2009 Lin et al. ................ 455/3.01

FOREIGN PATENT DOCUMENTS

| JP | 2007-258844 | 10/2007 |
| JP | 2007-306572 | 11/2007 |
| JP | 2008-092580 | 4/2008 |
| JP | 2008-118660 | 5/2008 |

OTHER PUBLICATIONS

"Office Action of Japan Counterpart Application" issued on Jul. 23, 2010, p. 1-p. 3, in which the listed references were cited.

* cited by examiner

*Primary Examiner* — Raymond S Dean
(74) *Attorney, Agent, or Firm* — Jianq Chyun IP Office

(57) ABSTRACT

A scheduling method for a wireless multi-hop relay communication system, wherein the communication system includes a base station dominating a plurality of relay stations, the scheduling method including separating the plurality of relay stations into N groups, N being a natural number, dividing a period for providing a service by the base station into N phases, wherein N is the number of the groups of the relay stations, serving the relay stations in a $j^{th}$ group during an $i^{th}$ phase by the base station, wherein $1 \leq i$, $j \leq N$, and serving a user or a subordinate relay station within service areas of the relay stations not in the $j^{th}$ group during the $i^{th}$ phase by the relay stations not in the $j^{th}$ group.

50 Claims, 10 Drawing Sheets

SCHEDULING METHODS AND SYSTEMS FOR WIRELESS MULTI-HOP RELAY COMMUNICATIONS

CROSS-REFERENCE TO RELATED APPLICATIONS

This application is a continuation-in-part of U.S. patent application Ser. No. 11/614,982, filed Dec. 22, 2006.

BACKGROUND OF THE INVENTION

The present invention relates to a method and a system for grouping relay stations in a wireless multi-hop relay communication system. More particularly, the present invention relates to a method for scheduling a wireless multi-hop relay communication system so as to improve the transmission efficiency and capacity of the wireless multi-hop communication system.

Next generation mobile communication systems may be envisioned to provide high-speed, high link quality, and high security transmissions, and may also be expected to support various communication services. An effective resource schedule/allocation method may have to be established to meet different quality of service (QoS) requirements from different users. Users located at cell boundary may have worse link quality due to the long transmission distance to a base station, and users in a cell with severe shadowing effect may also have worse link quality, thereby the foregoing users may not perform high-speed data transmissions. To resolve the foregoing problem, the deployment density of base stations may be increased to shorten the propagation distances between the base stations and the users so as to improve the link quality, or more base stations may be deployed at those areas with severe shadowing for improving the link quality of users in the areas. However, the cost of the base stations and the cost of the backhaul network connections may be substantially increased by the aforementioned method. On the other hand, the transmission power of the base station may be increased to improve the link quality and to reduce the cost of the base station. However, if the transmission power is increased, not only the transmission cost but also the interference level may be increased.

Multi-hop relay cell architecture may be a good solution when considering all factors such as QoS, deployment cost, transmission power, and coverage area of the cell. Relay stations may be deployed within a cell to relay information from a base station to mobile stations with worse link quality, and vise versa. It has been shown that using relay stations may improve cell coverage, user throughput and system capacity.

Relay stations may be deployed at areas with severe shadowing or near the cell boundary, the users who may not be directly served by base station may be served by the relay stations, therefore the effective coverage area of the base station may be extended.

A single link with worse quality may be divided into a plurality of links with better quality so that each of the links may provide higher transmission rate. However, since the same data may be duplicated and relayed over the air multiple times for multi-hop transmissions, it may consume the radio resources.

Moreover, since there may be a base station and several relay stations in a cell, to improve the spectrum efficiency, multiple serving stations may be active simultaneously if the potential interference is tolerant.

To obtain benefits for multi-hop relay communication systems, an efficient scheduling mechanism may require arranging the transmissions of base stations and relay stations.

To improve the performance of a wireless communication system, a method of relay stations deployment in a Manhattan-like environment was provided in the Wireless World Initiative New Radio (WINNER) program. The Manhattan-like environment is a grid environment wherein the width of blocks is about 200 meters (m) and the width of streets is about 30 m.

FIG. 2 is a diagram illustrating a first layout of a base station 205 and a plurality of relay stations 201 to 204 of a single cell in a Manhattan-like environment in a conventional communication system. Referring to FIG. 2, the base station 205 and the relay stations 201 to 204 are disposed in the single cell, and the base station 205 and the relay stations 201 to 204 may all communicate with users through omni-directional antennas. However, since the relay stations 201 to 204 may be disposed outside a coverage area 206 of the base station 205, each of the relay station 201 to 204 may require an additional directional antenna pointing at the base station 205 for communicating with the base station 205, and thus may increase the hardware cost of the relay stations.

FIG. 3 is a diagram illustrating a transmission scheduling for a frame structure applicable to the first layout shown in FIG. 2 within a single cell in the Manhattan-like environment. Referring to FIG. 3, a frame S301 may be divided into two sub-frames S302 and S303. The first sub-frame S302 may further be divided into 5 time slots S304 to S308, wherein a base station 305 may serve four relay stations 301 to 304 during the first four time slots S304 to S307, respectively, and the base station 305 may serve users within an area 306 which may be directly connected to the base station during the fifth time slot S308. The second sub frame S303 may be divided into two time slots S309 and S310, and with the characteristics of spatial separation of the environment, the relay stations 301 and 302 may serve users within areas 307 and 308 connected thereto during the same time slot S309, and the relay stations 303 and 304 may serve users within areas 309 and 310 connected thereto during another time slot S310.

FIG. 4 is a diagram illustrating a layout of base stations 405, 415 and relay stations 401 to 404, 411 to 414 in a multi-cell structure in the Manhattan-like environment illustrated in FIG. 2. Referring to FIG. 4, a coverage area 406 of a single cell A and a coverage area 416 of a single cell B are arranged in a staggered way. Moreover, the base stations 405 and 415 in FIG. 4 respectively represent the positions of the base stations in the single cell A and the single cell B, the relay stations 401 to 404 belong to the single cell A, and the relay stations 411 to 414 belong to the single cell B.

FIG. 5 is a diagram illustrating a transmission scheduling for a frame structure applicable to the layout shown in FIG. 4 within the multi-cell structure in the Manhattan-like environment. Referring to FIG. 5, an arrangement of transmission frames between adjacent cells may be used to permute the operation orders of sub-frames S502 and S503 in a frame S501 so that interference between cells may be prevented. The main purpose of the relay stations may be to extend the coverage area of the base station. However, the link quality of users at the boundary of the service range of the base station may not be improved. Moreover, all of the base stations may be idle for some time durations in the frame structure. Since base stations may be the only serving stations connected to the backhaul networks and carrying the effective data, the transmission efficiency of the base station in this design may not be desirable.

FIG. 6 is a diagram illustrating a second layout of a base station 605 and four relay stations 601 to 604 with omni-directional antennas in a Manhattan-like environment. Referring to FIG. 6, the base station 605 and the relay stations 601 to 604 may all communicate with users by using omni-directional antennas. Since the relay stations 601 to 604 are disposed within a coverage area 606 of the base station 605, no additional directional antenna may be required by each of the relay station 601 to 604 for communicating with the base station 605. With the design, the link quality of users in the cell boundary may be improved.

FIG. 7 is a diagram illustrating a transmission scheduling for a frame structure applicable to the second layout shown in FIG. 6 with all serving stations equipped with omni-directional antennas in the Manhattan-like environment. Referring to FIG. 7, the base station 705 may serve four relay stations 701 to 704 sequentially during first four time slots S701 to S704, and at the same time, the base station 705 may serve users directly connected to the base station 705. The relay stations 701 and 703 may serve users connected thereto during the time slot S705. After that, the relay stations 702 and 704 may serve users during the next time slot S706. The main purpose of such a layout may be to improve the link quality of users at cell boundary. However, a complete transmission within a single cell may require at least 6 phases to be completed. When considering the multi-cell structure, because of the use of omni-directional antennas, the reuse factor of at least 2 may be required to avoid the severe inter-cell interference, and thus decreases the overall system capacity.

Regardless of the first layout or the second layout that all serving stations are equipped with omni-directional antennas, all the base stations and the relay stations may be idle for some time in the frame structure. Accordingly, the transmission efficiency thereof may not be desirable. It may therefore be desirable to have a scheduling method for a wireless multi-hop relay communication system for improving the transmission efficiency and capacity of the system.

BRIEF SUMMARY OF THE INVENTION

Examples of the present invention may provide a scheduling method for a wireless multi-hop relay communication system, wherein the communication system comprises a base station dominating a plurality of relay stations, the scheduling method comprising separating the plurality of relay stations into N groups, N being a natural number, dividing a period for providing a service by the base station into N phases, wherein N is the number of the groups of the relay stations, serving the relay stations in a $j^{th}$ group during an $i^{th}$ phase by the base station, wherein $1 \leq i, j \leq N$, and serving a user or a subordinate relay station within service areas of the relay stations not in the $j^{th}$ group during the $i^{th}$ phase by the relay stations not in the $j^{th}$ group.

Some examples of the present invention may provide a scheduling method for a wireless multi-hop relay communication system, wherein the communication system includes a plurality of cells and each of the plurality of cells includes a base station and a plurality of relay stations, the scheduling method comprising separating the plurality of relay stations in each of the plurality of cells into N groups, N being a natural number, dividing a period for providing a service by the base station to each of plurality of cells into N phases, wherein N is the number of the groups of the relay stations in a cell, and the plurality of cells comprises two adjacent cells A and B, in the cell A, the base station serving the relay stations in a $j^{th}$ group during an $i^{th}$ phase, wherein $1 \leq i, j \leq N$, in the cell B, the base station serving the relay stations in a j group during an $i^{th}$ phase, wherein $1 \leq k \leq N$, in the cell A, relay stations not in the $j^{th}$ group serving a first user within the service areas of the relay stations not in the $j^{th}$ group during the $i^{th}$ phase, and in the cell B, relay stations not in the $k^{th}$ group serving a second user within the service areas of the relay stations not in the $k^{th}$ group during the $i^{th}$ phase, wherein the interference between the relay stations of the $j^{th}$ group in the cell A and the relay stations of the $k^{th}$ group in the cell B is within an interference threshold.

Other examples of the present invention may provide a system for reusing radio resources, the system comprising at least one relay station, and at least one base station capable of separating the relay stations into N groups based on the intensity of a potential interference level between one of the at least one base station and each of the relay stations, N being a natural number, wherein the one base station divides a service period into N phases, wherein N is the number of groups of the relay stations, and wherein the one base station serves the relay stations in the $j^{th}$ group during the $i^{th}$ phase, wherein $1 \leq i, j \leq N$, and the relay stations not in the $j^{th}$ group serve users within the service areas of the relay stations not in the $j^{th}$ group during the $i^{th}$ phase.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

The following examples will be described with a Manhattan-like environment, and those skilled in the art should be able to implement the present invention in any other environment according to the spirit of the present invention and the descriptions of the following examples. In following examples, interference level is weakened by spatial separation produced by the shadowing effect of surrounding buildings in the Manhattan-like environment.

Figure 8:
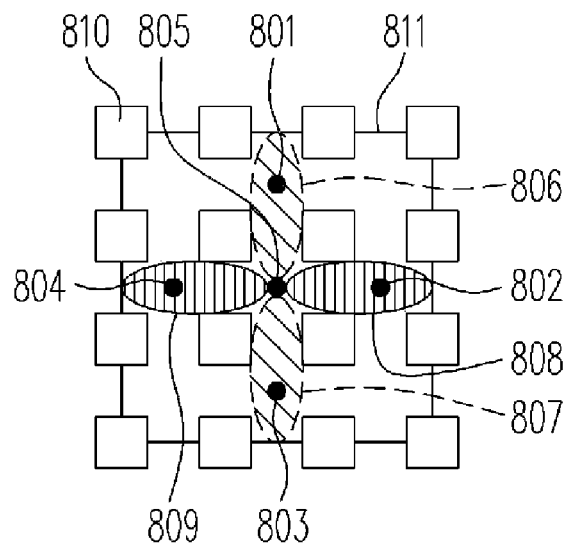
FIG. 8 is a diagram illustrating a layout of a base station and a plurality of relay stations in a Manhattan-like environment in accordance with an example of the present invention.

FIG. 8 is a diagram illustrating a layout of a base station 805 and a plurality of relay stations 801 to 804 in a Manhattan-like environment in accordance with an example of the present invention. Referring to FIG. 8, a microcell may cover 690*690 square meters, and the base station 805 may be disposed at a crossroad and the four relay stations 801, 802, 803 and 804 may be disposed at intersections of two crossed streets (not numbered) with other streets in four directions (not numbered). That is, the relay stations 801 to 804 may be disposed at the intersections of the line of sight (LOS) and have non line of sight (NLOS) of the base station 805.

The base station 805 may use four directional antennas or a four-sector antenna for transmitting data to users in the streets in four directions and the relay stations 801 to 804, and the relay stations 801 to 804 may use two directional antennas or two-sector antennas for data transmission with users within the NLOS of the base station 805. In other words, the base station 805 and the relay stations 801 to 804 may serve all users within a coverage area 811 of a cell. Wherein users within the LOS of the base station 805 may have single-hop links to the base station 805, while users outside the LOS of the base station 805 may establish multi-hop links to the base station 805 through the relay stations 801 to 804.

Figure 1:
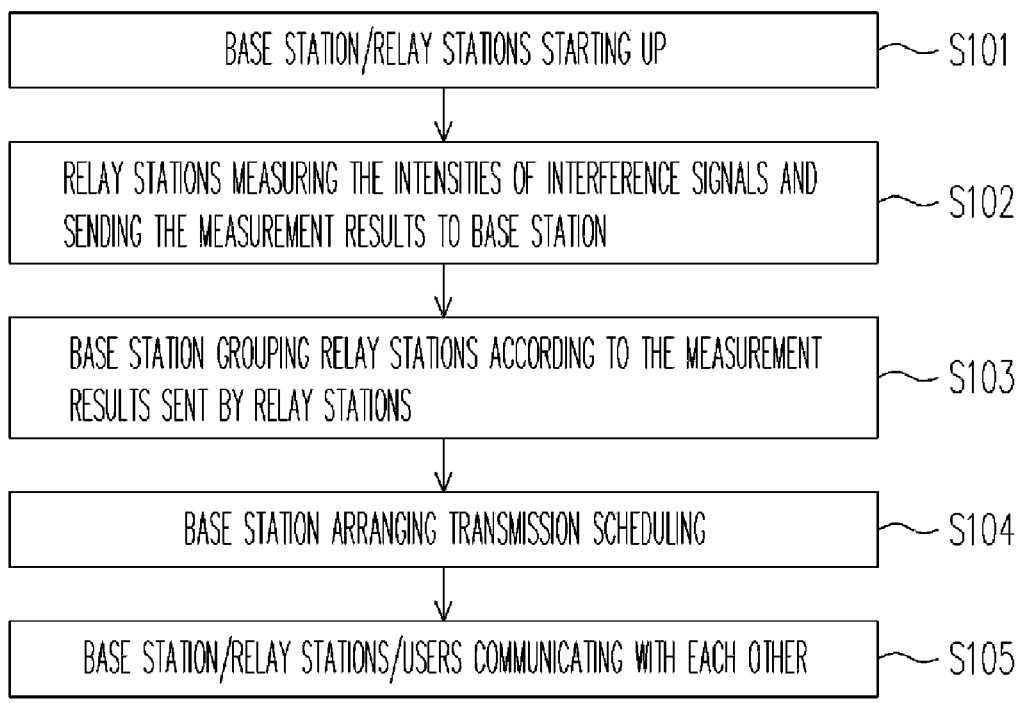
FIG. 1 is a flow diagram illustrating a scheduling method of a wireless multi-hop relay communication system in accordance with an example of the present invention.
Figure 2:
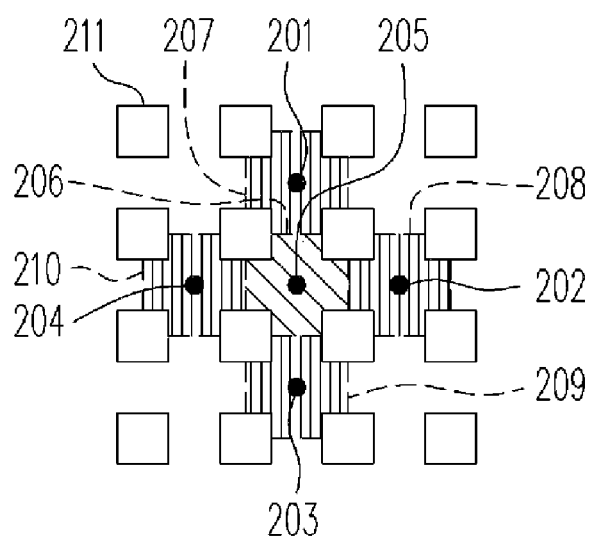
FIG. 2 is a diagram illustrating a first layout of a base station and a plurality of relay stations of a single cell in a Manhattan-like environment in a conventional communication system.
Figure 3:
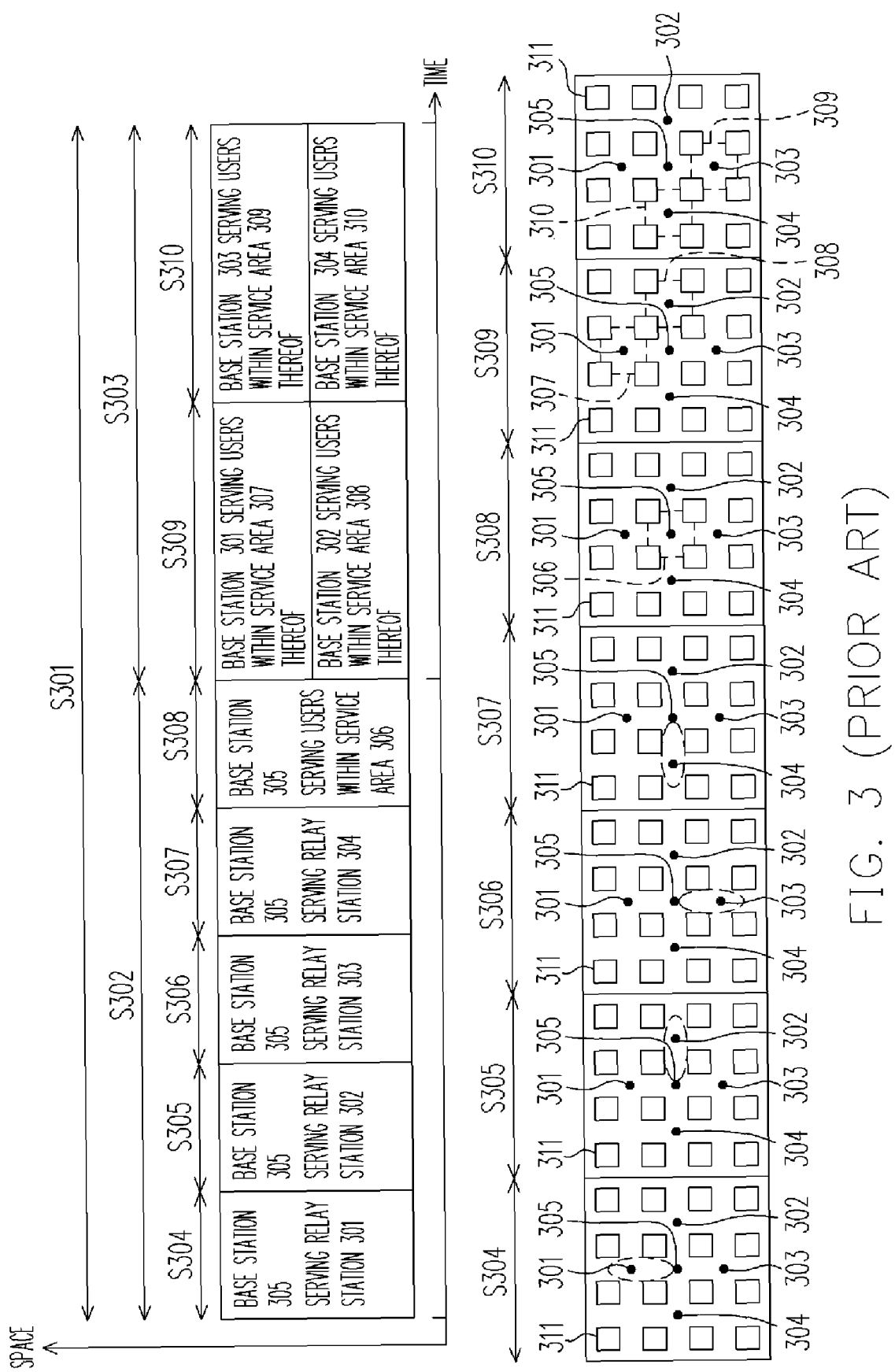
FIG. 3 is a diagram illustrating a transmission scheduling for a frame structure applicable to the first layout shown in FIG. 2 within a single cell in the Manhattan-like environment.
Figure 4:
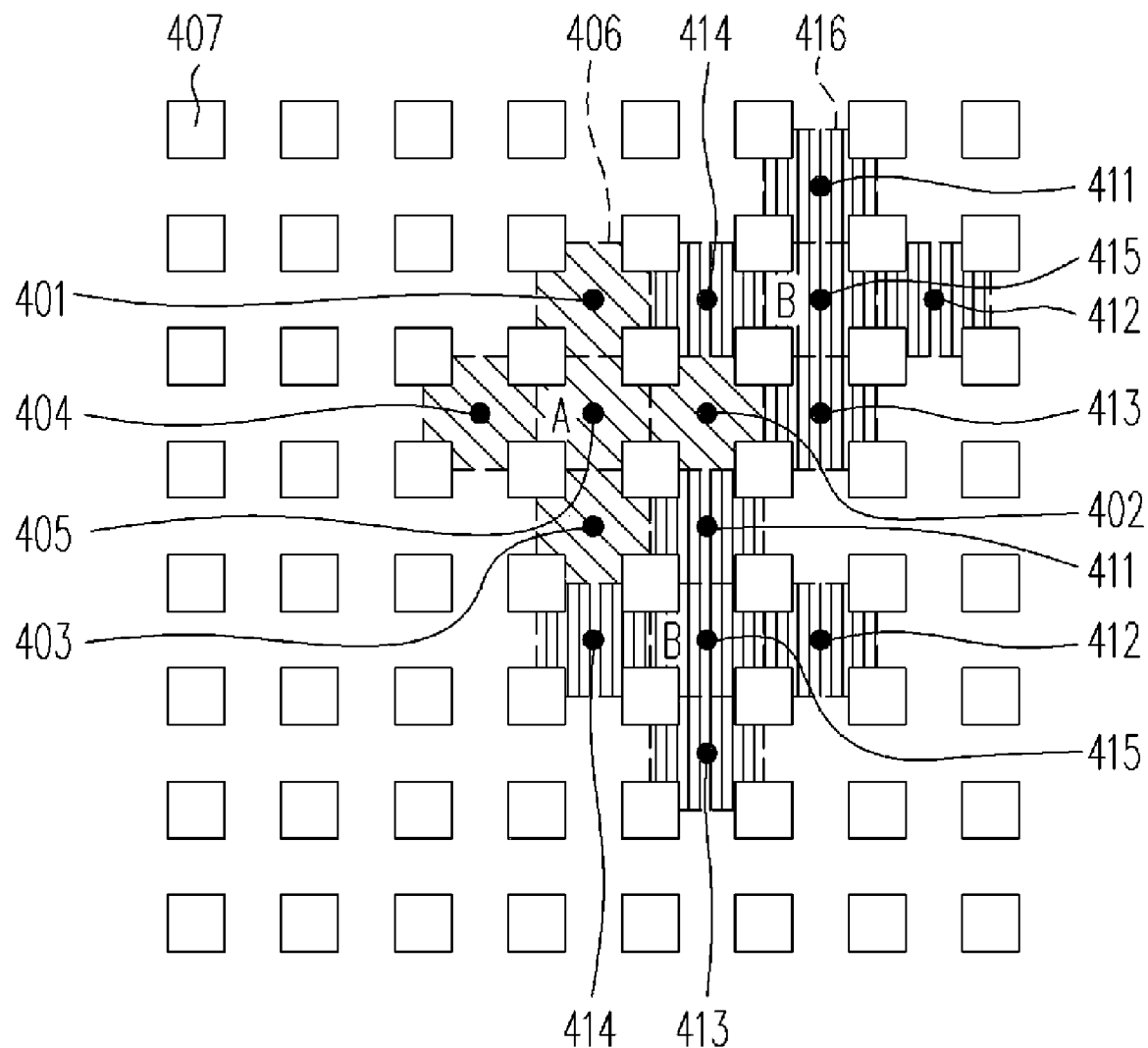
FIG. 4 is a diagram illustrating a layout of base stations and relay stations in a multi-cell structure in the Manhattan-like environment illustrated in FIG. 2.
Figure 5:
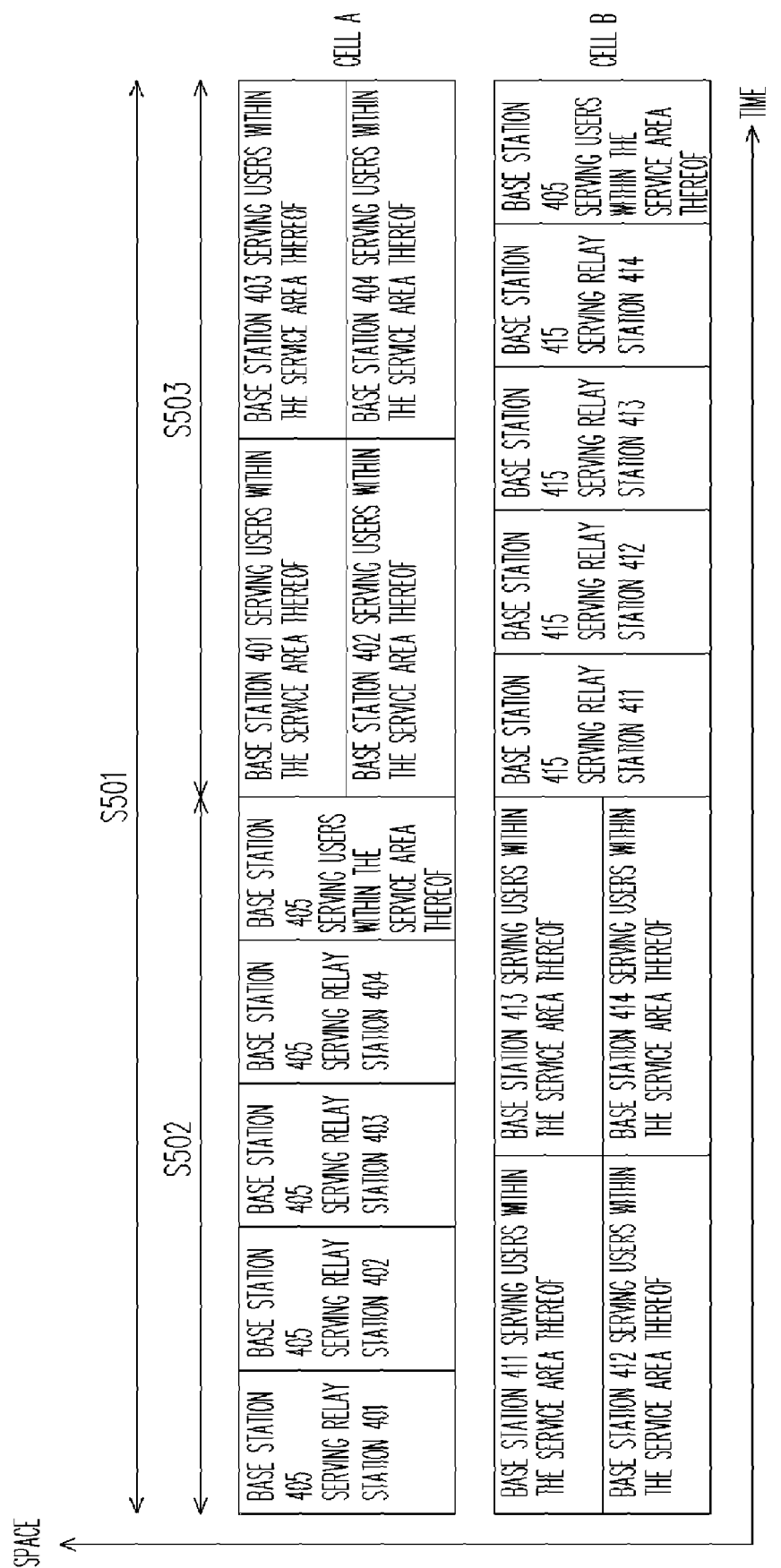
FIG. 5 is a diagram illustrating a transmission scheduling for a frame structure applicable to the layout shown in FIG. 4 within the multi-cell structure in the Manhattan-like environment.
Figure 6:
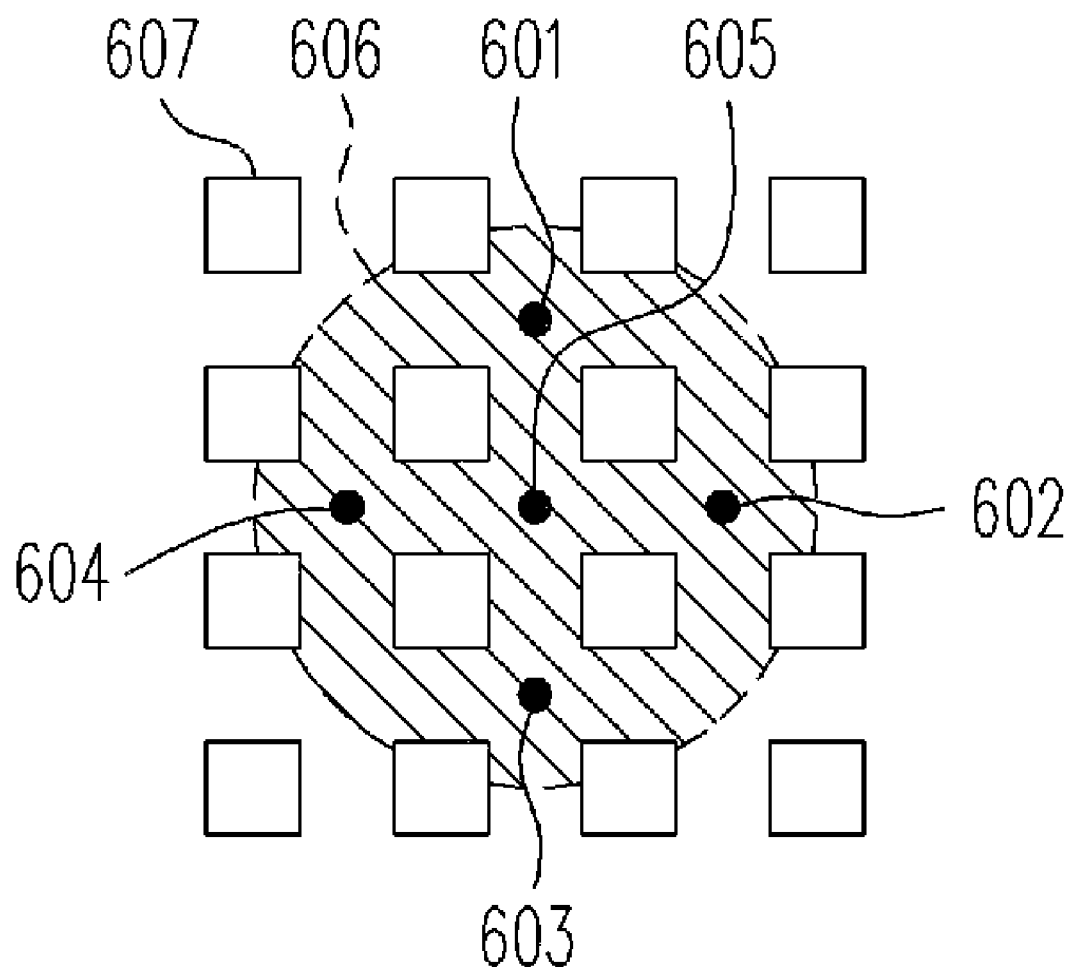
FIG. 6 is a diagram illustrating a second layout of a base station and four relay stations with omni-directional antennas in a Manhattan-like environment.
Figure 7:
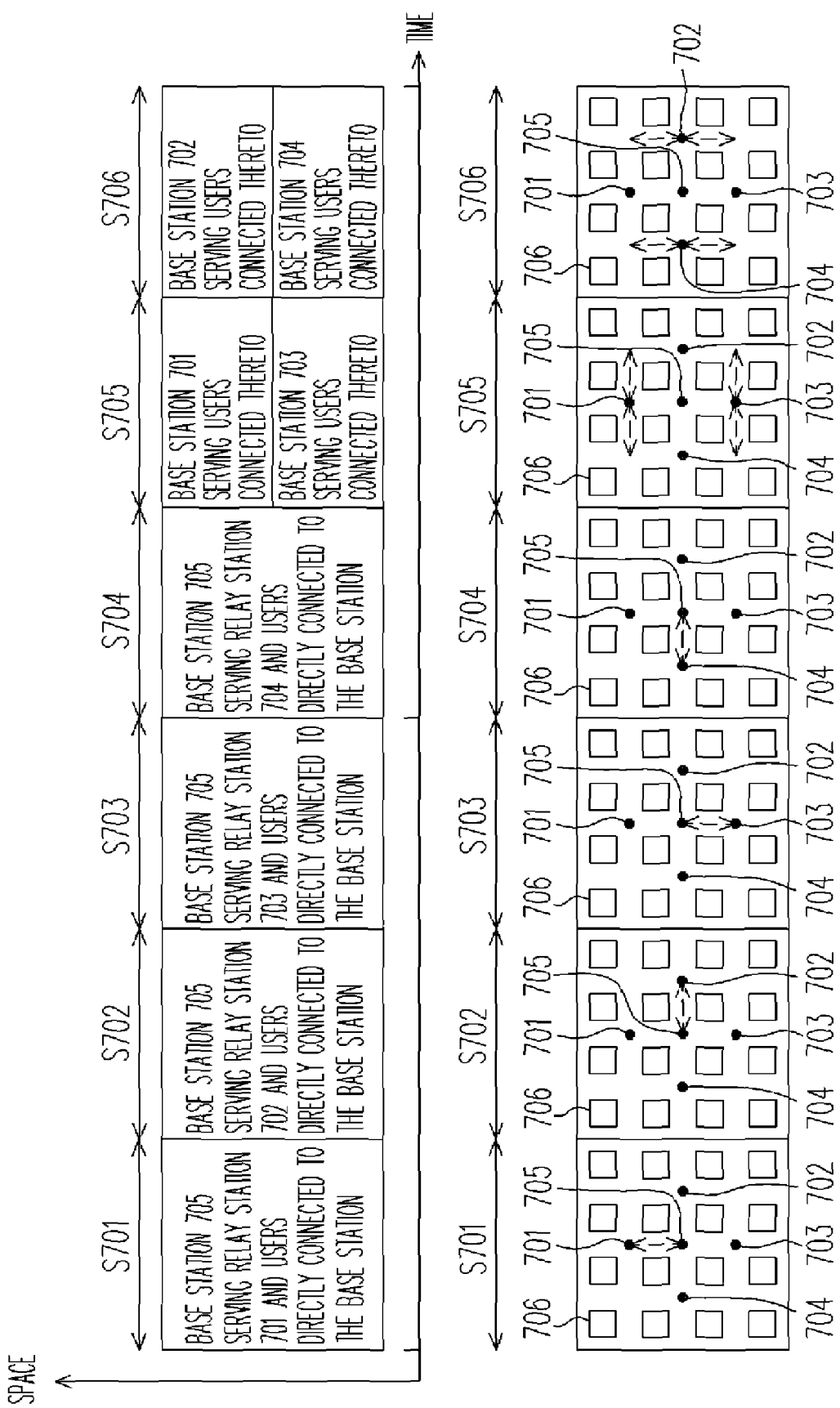
FIG. 7 is a diagram illustrating a transmission scheduling for a frame structure applicable to the second layout shown in FIG. 6 with all serving stations equipped with omni-directional antennas in the Manhattan-like environment.

FIG. 1 is a flow diagram illustrating a scheduling method of a wireless multi-hop relay communication system in accordance with an example of the present invention. Referring to FIG. 1, after the base station 805 and the relay stations 801 to 804 are started up in step S101, the relay stations 801 to 804 may respectively measure the intensities of an interference level from other relay stations and base stations in step S102, wherein the potential interference level may be measured by measuring a data signal or a reference signal transmitted by the relay stations and base stations respectively. Furthermore, the data signal or the reference signal may include a preamble with a preamble index and a least signal strength of the wireless multi-hop relay communication system. Moreover, the intensities of the potential interference level may be measured by measuring a signal-to-interference-and-noise-ratio (SINR), a carrier-to-interference-and-noise-ratio (CINR) or a received signal strength indicator (RSSI) of the data signal or the reference signal.

In step S103, the relay stations 801 to 804 may report the measurement results thereof back to the base station 805. Next, the base station 805 may separate the relay stations 801 to 804 into groups based on the measurement results from the relay stations 801 to 804. The base station 805 may separate relay stations that may potentially go beyond a tolerable interference threshold into different groups. For example, the relay stations 801 and 803 may be put into a group A, while the relay stations 802 and 804 may be put into a group B. Alternatively, if the transmission target of one of the relay stations 801 to 804 is another relay station and the target relay station not capable of receiving and transmitting data at the same time, the two relay stations are put into different groups. Moreover, since the number of groups may be related to the number of phases in a transmission scheduling, and may therefore influence the efficiency of utilization of the communication system, the number of groups may be kept as small as possible.

In step S104, the base station 805 may arrange a transmission scheduling for the relay stations 801 to 804 after the relay stations 801 to 804 are grouped, wherein the number of groups may be regarded as the number of phases in a service period for the transmission scheduling. Subsequently, in step S105, the base station 805, the relay stations 801 to 804 and the users may start to communicate with one another.

In one example, if the number of groups is N, then a service period of a complete transmission scheduling may be divided into N phases, and a downlink transmission and an uplink transmission may be contained in each phase. The service period may be the length of a frame and the frame is divided into N phases. Also, the service period may be the length of a plurality of frames and the frames altogether are divided into N phases. The downlink and the uplink transmissions during various phases in a frame may be arranged accordingly to the definition of the frame. For example, the downlink and the uplink transmissions during various phases may be arranged alternatively, or the downlink transmission of various phases are arranged before the uplink transmissions. Skilled persons in the art will understand that other examples of arrangement for the downlink and the uplink transmissions may be possible. In one example, the relay stations 801 to 804 may be separated into 2 groups and thus a service period may be divided into 2 phases.

Figure 9:
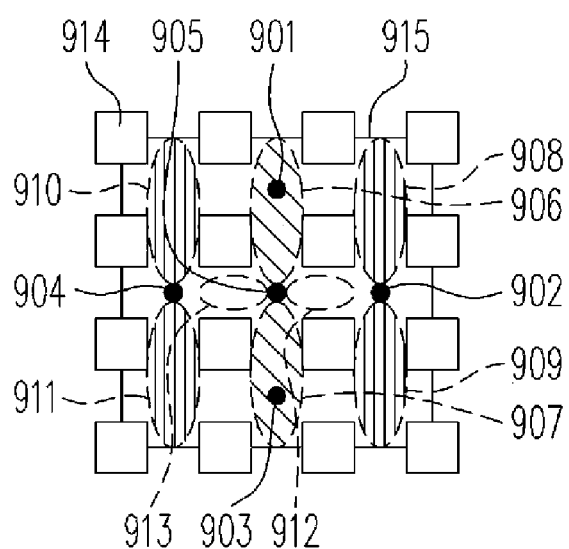
FIG. 9 is a diagram illustrating a first phase of a transmission scheduling for an uplink transmission and a downlink transmission within a single cell in accordance with another example of the present invention.

FIG. 9 is a diagram illustrating a first phase of a transmission scheduling for an uplink transmission and a downlink transmission within a single cell in accordance with another example of the present invention. Referring to FIG. 9, during the first phase, the base station 905 may serve the relay stations 901 and 903 in a first group (referred to as the group A hereinafter) and users within LOS 906 and 907 of a base station 905 in a direction of the group A. The base station 905 may serve the group A through, for example, a downlink transmission and/or an uplink transmission.

The downlink transmission refers to a transmission that the base station 905 transmits data to the relay stations 901 and 903 in the group A and to the users within the LOS 906 and 907 of the base station 905 in the direction of the group A. During the same phase, the relay station 902 in a second group (referred to as the group B hereinafter) may relay the data received from the base station 905 during the previous phase to users within an NLOS of the base station 905 and within the LOS 908 and 909 of the group B, and the relay station 904 in the group B may relay the data received from the base station 905 during the previous phase to the users within the NLOS of the base station 905 and within the LOS 910 and 911 of the group B. Moreover, depending on applications, the base station 905 may be configured to serve users within service areas 912 and 913 around the base station 905 and in the direction of the group B with appropriate power control at a relatively low transmission power during the first phase. Such lower transmission power may reduce the interference in the relay stations 901 to 904 caused by the base station 905 to a level lower than a tolerable threshold.

The uplink transmission refers to a transmission that the relay stations 901 and 903 in the group A and the users within the LOS 906 and 907 of the base station 905 in the direction of the group A transmit data to the base station 905. During the same phase, the relay station 902 in the group B may receive uplink data from users within the areas 908 and 909, and the relay station 904 in the group B may receive uplink data from the users within the areas 910 and 911. Moreover, depending on applications, the users within the service areas 912 and 913 around the base station 905 and in the direction of the group B may be allowed to transmit uplink data to the base station 905 during the first phase.

Figure 10:
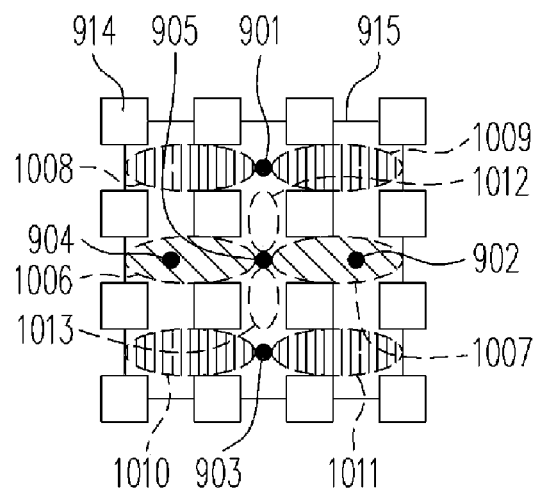
FIG. 10 is a diagram illustrating a second phase of a transmission scheduling for an uplink transmission and a downlink transmission within a single cell in accordance with still another example of the present invention.

FIG. 10 is a diagram illustrating a second phase of a transmission scheduling for an uplink transmission and a downlink transmission within a single cell in accordance with still another example of the present invention. Referring to FIG. 10, during the second phase, the base station 905 may serve the group B and users within LOS 1006 and 1007 of the base station 905 in the direction of the group B. The base station 905 may serve the group B through, for example, a downlink transmission and/or an uplink transmission.

The downlink transmission during the second phase may refer to a transmission that the base station 905 transmits data to the relay stations 902 and 904 in the group B and the users within the LOS 1006 and 1007 of the base station 905 in the direction of the group B. During the same phase, the relay stations 901 and 903 in the group A may respectively relay data received from the base station 905 during the previous phase to users within the NLOS of the base station 905 and within the LOS 1008 to 1009 and 1010 to 1011 of the group A. Moreover, the base station 905 may be configured to serve users in the service areas 1012 and 1013 around the base station 905 and in the direction of the group A with appropriate power control at a relatively low transmission power during the second phase.

The uplink transmission during the second phase refers to a transmission that the relay stations 902 and 904 in the group B and the users within the LOS 1006 and 1007 of the base station 905 in the direction of the group B may transmit data to the base station 905. During the same phase, the relay station 901 in the group A may receive uplink data from users in areas 1008 and 1009, and the relay station 903 in the group A may receive uplink data from the users within areas 1010 and 1011. Moreover, the users within the areas 1012 and 1013 may be allowed to transmit uplink data to the base station 905 during the second phase.

Figure 11:
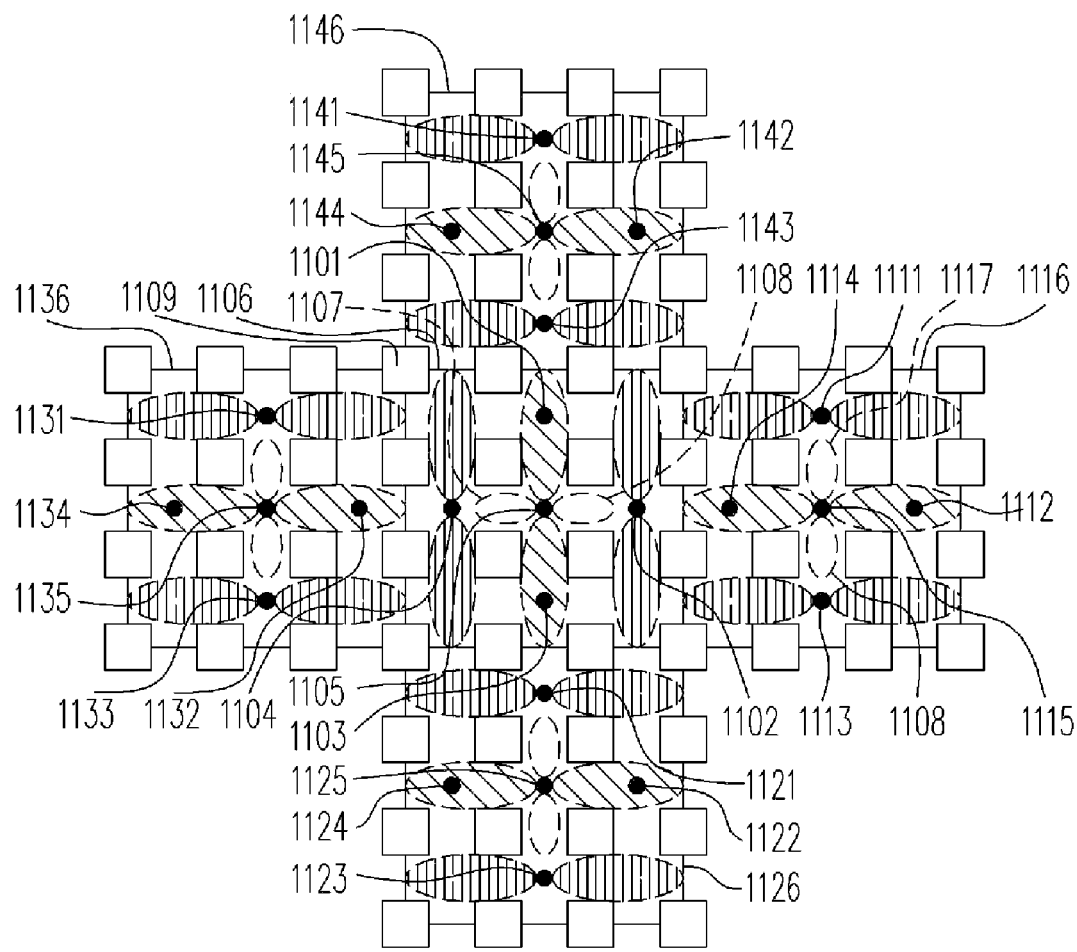
FIG. 11 is a diagram illustrating a first phase of a transmission scheduling for an uplink transmission and a downlink transmission between adjacent cells in accordance with yet another example of the present invention.

FIG. 11 is a diagram illustrating a first phase of a transmission scheduling for an uplink transmission and a downlink transmission between adjacent cells in accordance with yet another example of the present invention. Referring to FIG. 11, in a multi-cell structure, service orders of transmission scheduling of two adjacent cells may be permuted with interferences between cells and signal quality of users at cell boundary. Wherein the cells adjacent to a cell A (with a coverage area 1106) in four directions include a cell B (with a coverage area 1116), a cell C (with a coverage area 1126), a cell D (with a coverage area 1136) and a cell E (with a coverage area 1146). A base station 1115 and relay stations 1111 to 1114 may be disposed in the coverage area 1116 of the cell B, a base station 1125 and relay stations 1121 to 1124 may be disposed in the coverage area 1126 of the cell C, a base station 1135 and relay stations 1131 to 1134 may be disposed in the coverage area 1136 of the cell D, and a base station 1145 and relay stations 1141 to 1144 may be disposed in the coverage area 1146 of the cell E. In one example, the service orders of the cells B to E may be assumed to be the same. Accordingly, only the cell B will be described by way of an example below.

Within the coverage area 1106 of the cell A, when the base station 1105 serves the relay stations 1101 and 1103 in the group A and users within the LOS of the base station 1105 in the direction of the group A (i.e., the group A which performs single cell transmission scheduling), the adjacent base stations in four directions, for example, the base station 1115 in the coverage area 1116 of the cell B, may serve the relay stations 1112 and 1114 in the group B and users in the LOS of the base station 1115 in the direction of the group B (i.e., the group B which performs single cell transmission scheduling). Meanwhile, the relay stations 1102 and 1104 in the group B within the coverage area 1106 of the cell A and the relay stations 1111 and 1113 in the group A within the coverage area 1116 of the cell B may perform data transmission (serving users). In another example, the base stations 1105 and 1115 may respectively transmit data to users within areas 1107 to 1108 and 1117 to 1118 at a relatively low transmission power.

Figure 12:
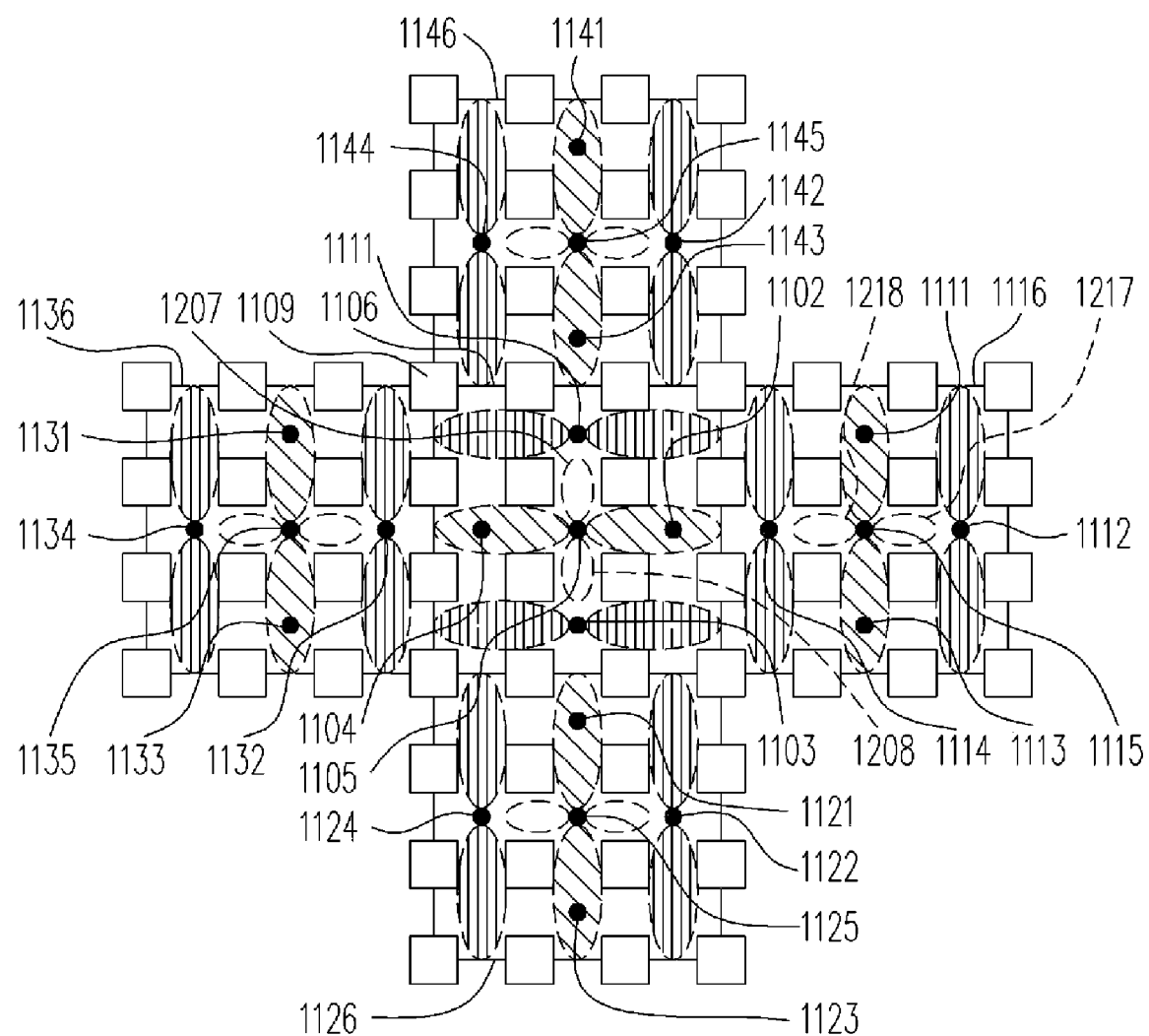
FIG. 12 is a diagram illustrating a second phase of a transmission scheduling for an uplink transmission and a downlink transmission between adjacent cells in accordance with yet still another example of the present invention.

FIG. 12 is a diagram illustrating a second phase of a transmission scheduling for an uplink transmission and a downlink transmission between adjacent cells in accordance with yet still another example of the present invention. Referring to FIG. 12, within the coverage area 1106 of the cell A, when the base station 1105 serves the relay stations 1102 and 1104 in the group B and users within the LOS of the base station 1105 in the direction of the group B, the adjacent base stations in four directions, for example, the base station 1115 in the coverage area 1116 of the cell B, may serve the relay stations 1111 and 1113 in the group A and users within the LOS of the base station 1115 in the direction of the group A. Meanwhile, the relay stations 1101 and 1103 in the group A within the coverage area 1106 of the cell A and the relay stations 1112 and 1114 in the group B within the coverage area 1116 of the cell B may perform data transmission (serving users). In another example, the base stations 1105 and 1115 respectively transmit data to users within areas 1207 to 1208 and 1217 to 1218 at a relatively low transmission power.

Figure 13:
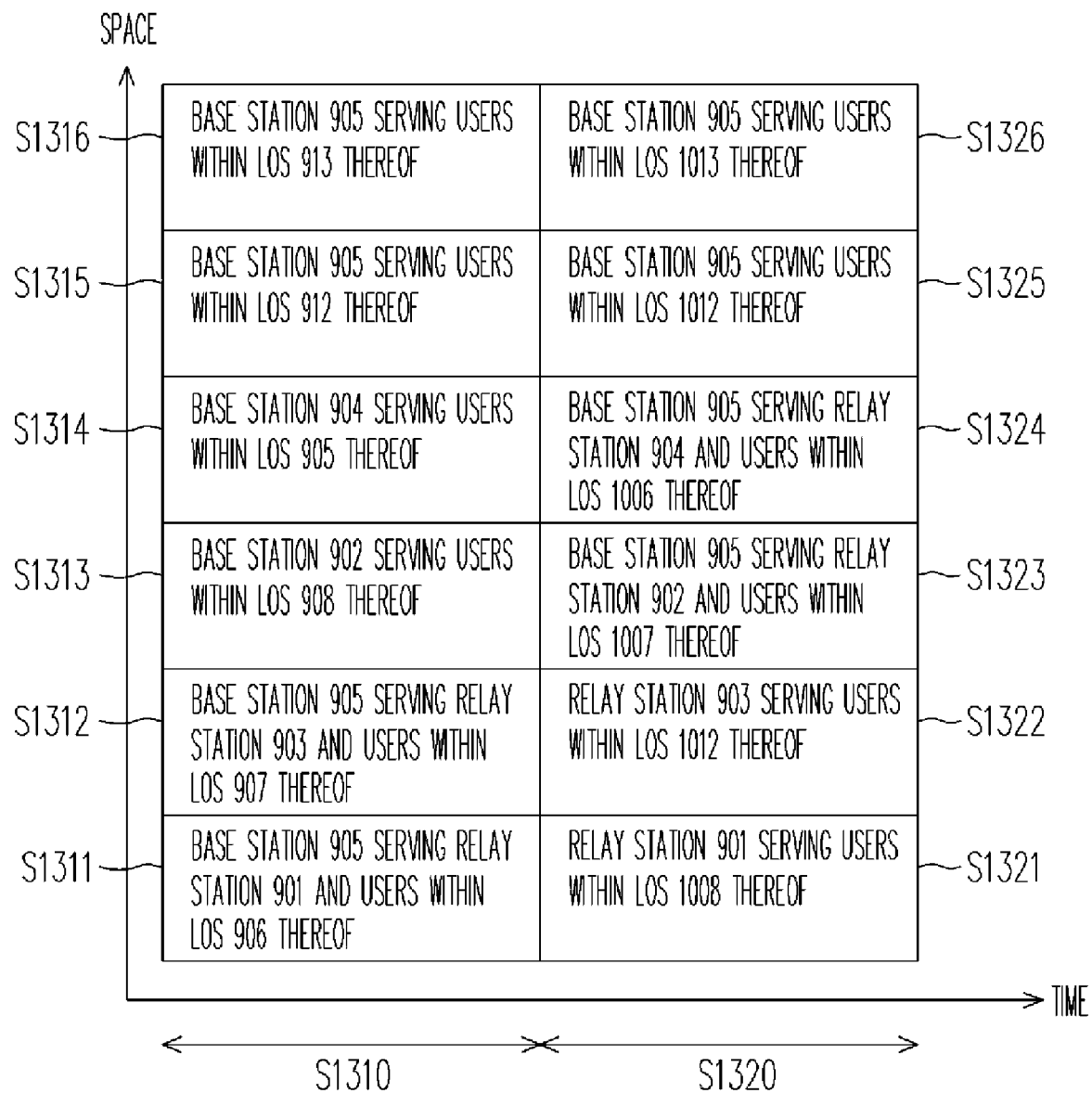
FIG. 13 is a diagram illustrating operations of a transmission scheduling during various phases of a single cell in accordance with an example of the present invention.

FIG. 13 is a diagram illustrating operations of a transmission scheduling during various phases of a single cell in accordance with an example of the present invention. Referring to FIG. 13 and also FIGS. 9 and 10, operations S1311 and S1312 during a first phase S1310 of a single cell transmission scheduling may include the fact that the base station 905 serves the relay stations 901 and 903 in the group A and the users within areas 906 and 907. During the same phase, operations S1313 and S1314 of a single cell transmission scheduling S1310 may include the fact that the relay stations 902 and 904 in the group B respectively serve the users within areas 908 to 909 and areas 910 to 911. Moreover, based on actual requirements, the operations S1315 and S1316 during the first phase S1310 of a single cell transmission scheduling may include the fact that the base station serves users within areas 912 and 913.

Operations S1323 and S1324 during the second phase S1320 of a single cell transmission scheduling may include the fact that the base station 905 serves the relay stations 902 and 904 in the group B and the users within areas 1006 and 1007. During the same phase, operations S1321 and S1322 of the single cell transmission scheduling may include the fact that the relay stations 901 and 903 in the group A respectively serve the users within areas 1008 to 1009 and areas 1010 to 1011. Moreover, based on actual requirements, operations S1325 and S1326 during the second phase S1320 of a single cell transmission scheduling may include the fact that the base station 905 serves the users within areas 1012 and 1013.

In a multi-cell structure, service orders of the transmission scheduling in the frame structures of two adjacent cells are permuted with interferences between cells and the signal quality of users at cell boundary in consideration.

Table 1 shows related comparisons between the present invention and the conventional technique in the communication system. In Table 1, the "frequency reuse factor" refers to the ratio of usable frequency of a single cell to the usable frequency of the system. Furthermore, since a base station is the only serving station connected to the backhaul network in a cell, the "effective frame" refers to the number of frames a base station receives and sends during a service period. Moreover, the "capacity gain" is the gain obtained with the "frequency reuse factor" and the "effective frame" in consideration. The present invention is compared to the second setup in the WINNER's design with all serving stations equipped with omni-directional antennas of the same coverage areas. "First design example of the present invention" is a design example wherein the base station does not serve users around the base station at a relatively low transmission power, and "Second design example of the present invention" is a design example wherein the base station serves users around the base station with appropriate power control at a relatively low transmission power.

In the second setup in the WINNER's design with all serving stations equipped with omni-directional antennas, data have to be transmitted between adjacent cells at different frequencies to prevent interference between adjacent cells. Accordingly, the "frequency reuse factor" thereof is ½. In this design, 6 phases are needed to complete a downlink transmission and/or an uplink transmission. The actual number of frames transmitted by the base station is 4, and thus the "effective frame" is ⅔ (=⁴⁄₆).

According to the first design example of the present invention, data may be transmitted at the same frequency between adjacent cells. Accordingly, the "frequency reuse factor" thereof is 1. And during the two phases of a complete downlink transmission, the base station actually transmits 4 frames, and thus the "effective frame" thereof is 2. The uplink transmission is similar to the downlink transmission. Furthermore, if it is assumed that the "capacity gain" of the second setup in the WINNER's design with all serving stations equipped with omni-directional antennas is 1, then the first design of the present invention may exceed 2 times in the usage of frequency spectrum. The "effective frame" of the first design of the present invention is 3 times that of the second setup in the WINNER's design with all serving stations equipped with omni-directional antennas, resulting in a "capacity gain" of "6."

In the second design example of the present invention, since data may be transmitted at the same frequency between adjacent cells, the "frequency reuse factor" thereof is 1. During the 2 phases of a complete downlink transmission, the base station actually transmits 8 frames, and thus the "effective frame" is 4. The uplink transmission is similar to the downlink transmission. Furthermore, if the "capacity gain" of the second setup in the WINNER's design with all serving stations equipped with omni-directional antennas is assumed to be 1, then the first design of the present invention may exceed 2 times in the usage of frequency spectrum. The "effective frames" of the first design of the present invention is 6 times that of the second setup in the WINNER's design with all serving stations equipped with omni-directional antennas, resulting in a "capacity gain" of "12."

TABLE 1

Comparisons between examples of the present invention and conventional technique

| | Frequency reuse factor | Effective frames | Capacity gain |
|---|---|---|---|
| The second setup in the WINNER's design with all serving stations equipped with omni-directional antennas. | ½ | ⅔ | 1 |
| First design example of the present invention. | 1 | 2 | 6 |
| Second design example of the present invention. | 1 | 4 | 12 |

In summary, according to examples of the present invention, in a wireless multi-hop relay communication system, the service areas of the base station and relay stations may be divided into a plurality of regions by using the shadowing effect of the surroundings. The intensity of an interference level may be measured by each of the relay stations and sent to the base station, based on which the base station may separate the relay stations into different groups so that the base station may serve the groups sequentially in time domain. With desirable isolation from interference signals due to shadow effect, the same radio resources may be reused and scheduled for different relay stations, thereby improving the system capacity with insignificant interference increment. In a multi-cell structure, universal frequency reuse may be achieved by permuting the group service orders of transmission scheduling of adjacent cells. Through the mechanism of grouping and permutation of transmission scheduling, interference inside a single cell and between adjacent cells may be prevented and high spectrum efficiency may be achieved through aggressive radio frequency reuse. Furthermore, in the transmission scheduling structure provided by the present invention, the base station may transmit data during various phases so that the effective cell/system capacity may be improved considerably.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A scheduling method for a wireless multi-hop relay communication system, wherein the communication system comprises a base station dominating a plurality of relay stations, the scheduling method comprising:
    separating the plurality of relay stations into N groups, N being a natural number;
    dividing a period for providing a service by the base station into N phases, wherein N is the number of the groups of the relay stations;
    serving the relay stations in a $j^{th}$ group during an $i^{th}$ phase by the base station, wherein $1 \leq i, j \leq N$; and
    serving a user or a subordinate relay station within service areas of the relay stations not in the $j^{th}$ group during the $i^{th}$ phase by the relay stations not in the $j^{th}$ group.

2. The method of claim 1, wherein the plurality of relay stations are deployed to have line of sight (LOS) condition to the base station.

3. The method of claim 1, wherein the plurality of relay stations are deployed within a service area of the base station.

4. The method of claim 1, wherein a relay station of the plurality of relay stations serves a user having no LOS condition to the base station.

5. The method of claim 1, wherein a relay station of the plurality of relay stations serves a user having better link quality to link to the relay station than link to the base station.

6. The method of claim 1, wherein separating the plurality of relay stations into N groups further comprises:
    measuring the intensity of a potential interference level between another relay station or another base station and each of the plurality of relay stations and generating a measuring result, wherein the intensity of the potential interference level is measured by measuring a data signal or a reference signal transmitted by the other relay station or the other base station at each of the plurality of relay stations;
    reporting the measuring result to the base station by each of the plurality of relay stations; and
    separating the plurality of relay stations into the N groups by the base station based on the measuring result from each of the plurality of relay stations.

7. The method of claim 6, wherein the plurality of relay stations include the other relay station.

8. The method of claim 6, wherein the intensity of the potential interference level is measured by measuring at least one of a signal-to-interference-and-noise-ratio (SINR), a carrier-to-interference-and-noise-ratio (CINR) or a received signal strength indicator (RSSI) of the data signal or the reference signal.

9. The method of claim 1, wherein separating the plurality of relay stations into N groups further comprises:
    determining a scheduling order of the groups by the base station.

10. The method of claim 6, wherein separating the plurality of relay stations into the N groups by the base station based on the measuring result from each of the plurality of relay stations further comprises:
    separating two of the plurality of relay stations into different groups if the intensity of the potential interference between the two relay stations is beyond a threshold.

11. The method of claim 1, wherein separating the plurality of relay stations into N groups further comprises:
    separating two of the plurality of relay stations into different groups if a transmission target for one of the two relay stations to transmit data to is the other one of the two relay stations and the transmission target is not capable of transmitting and receiving the data at the same time.

12. The method of claim 1, wherein the period for providing a service by the base station includes a length of a frame or a plurality of frames in time domain, the length being capable of being divided into N phases in time domain.

13. The method of claim 1 further comprising:
    serving a user in a direction of the relay stations in the $j^{th}$ group during the $i^{th}$ phase by the base station.

14. The method of claim 13, wherein serving a user in a direction of the relay stations in the $j^{th}$ group during the $i^{th}$ phase by the base station further comprises:
    performing a downlink transmission from the base station to the user in the direction of relay stations in the $j^{th}$ group during the $i^{th}$ phase; and
    performing an uplink transmission from the user in the direction of relay stations in the $j^{th}$ group to the base station during the $i^{th}$ phase.

15. The method of claim 1 further comprising:
    serving an user not in the direction of the relay stations in the $j^{th}$ group but having the LOS condition to the base station at a transmission power level low enough to keep the interference caused by the base station in the relay stations within a threshold during the $i^{th}$ phase.

16. The method of claim 1, wherein serving the relay stations in a $j^{th}$ group during an $i^{th}$ phase by the base station comprises:
    performing a downlink transmission from the base station to the relay stations in the $j^{th}$ group during the $i^{th}$ phase; and
    performing an uplink transmission from the relay stations in the $j^{th}$ group to the base station during the $i^{th}$ phase.

17. The method of claim 1, wherein serving a user or a subordinate relay station within service areas of the relay stations not in the $j^{th}$ group during the $i^{th}$ phase by the relay stations not in the $j^{th}$ group comprises:
    performing a downlink transmission from the relay stations not in the $j^{th}$ group to a user within the service areas of the relay stations not in the $j^{th}$ group during the $i^{th}$ phase; and
    performing an uplink transmission from the user within the service areas of the relay stations not in the $j^{th}$ group to the relay stations not in the $j^{th}$ group during the $i^{th}$ phase.

18. The method of claim 1, wherein the user includes at least one of a mobile communication apparatus, a mobile phone or a radio terminal reception equipment.

19. A scheduling method for a wireless multi-hop relay communication system, wherein the communication system includes a plurality of cells and each of the plurality of cells includes a base station and a plurality of relay stations, the scheduling method comprising:

separating the plurality of relay stations in each of the plurality of cells into N groups, N being a natural number;

dividing a period for providing a service by the base station to each of plurality of cells into N phases, wherein N is the number of the groups of the relay stations in a cell, and the plurality of cells comprises two adjacent cells A and B, in the cell A, the base station serving the relay stations in a $j^{th}$ group during an $i^{th}$ phase, wherein $1 \leq i, j \leq N$;

in the cell B, the base station serving the relay stations in a $k^{th}$ group during an $i^{th}$ phase, wherein $1 \leq k \leq N$;

in the cell A, relay stations not in the $j^{th}$ group serving a first user within the service areas of the relay stations not in the $j^{th}$ group during the $i^{th}$ phase; and in the cell B, relay stations not in the $k^{th}$ group serving a second user within the service areas of the relay stations not in the $k^{th}$ group during the $i^{th}$ phase, wherein the interference between the relay stations of the $j^{th}$ group in the cell A and the relay stations of the $k^{th}$ group in the cell B is within an interference threshold.

20. The method of claim 19, wherein the plurality of relay stations in each of the plurality of cells are deployed to have LOS condition to the base station in the cell.

21. The method of claim 19, wherein the plurality of relay stations in each of the plurality of cells are deployed within the service area of the base station in the cell.

22. The method of claim 19, wherein the plurality of relay stations in each of the plurality of cells serve a user having no LOS condition to the base station in the cell.

23. The method of claim 19, wherein the plurality of relay stations in each of the plurality of cells serve a user having better link quality to link to a relay station of the plurality of relay stations in a cell of the plurality of cells than link to the base station in the cell.

24. The method of claim 19, wherein separating the plurality of relay stations in each of the plurality of cells into N groups comprises:

measuring the intensity of a potential interference level between another relay station or another base stations and each of the plurality of relay stations in a cell of the plurality of cells and generating a measuring result at each of the plurality of relay stations in the cell, wherein the intensity of the potential interference level is measured by measuring a data signal or a reference signal transmitted by the other relay station or the other base station;

reporting the measuring result from each of the plurality of relay stations in the cell to the base station in the cell; and separating the plurality of relay stations into the N groups by the base station in the cell based on the measuring result.

25. The method of claim 24, wherein the plurality of relay stations in the cell includes the other relay station.

26. The method of claim 19, wherein the intensity of the potential interference level is measured by measuring at least one of a signal-to-interference-and-noise-ratio (SINR), a carrier-to-interference-and-noise-ratio (CINR) or a received signal strength indicator (RSSI) of the data signal or the reference signal.

27. The method of claim 19, wherein separating the plurality of relay stations in each of the plurality of cells into N groups comprises:

determining a scheduling order of the groups in each of the plurality of cells by the base station in each of the plurality of cells.

28. The method of claim 24, wherein separating the plurality of relay stations into N groups by the base station in the cell based on the measuring result comprises:

separating two of the plurality of relay stations into different groups in each of the plurality of cells if the intensity of the potential interference between the two relay stations is beyond an interference threshold.

29. The method of claim 19, wherein separating the plurality of relay stations in each of the plurality of cells into N groups comprises:

separating two of the plurality of relay stations in each of the plurality of cells into different groups if a transmission target for one of the two relay stations to transmit data to is the other one of the two relay stations and the transmission target is not capable of transmitting and receiving the data at the same time.

30. The method of claim 19, wherein the period for providing a service by the base station includes a length of a frame or a plurality of frames in time domain, the length being capable of being divided into N phases in time domain.

31. The method of claim 19 further comprising:

in the cell A, the base station serving a third user in a first direction of relay stations in the $j^{th}$ group during the $i^{th}$ phase; and in the cell B, the base station serving a forth user in a second direction of relay stations in the $k^{th}$ group during the $i^{th}$ phase.

32. The method of claim 31 further comprising:

in the cell A, performing a first downlink transmission from the base station to the third user in the first direction of the relay stations in the $j^{th}$ group during the $i^{th}$ phase;

in the cell A, performing a first uplink transmission from the third user in the first direction of the $j^{th}$ group to the base station during the $i^{th}$ phase;

in the cell B, performing a second downlink transmission from the base station to the forth user in the second direction of the relay stations in the $k^{th}$ group during the $i^{th}$ phase; and in the cell B, performing a second uplink transmission from the forth user in the second direction of the $k^{th}$ group to the base station during the $i^{th}$ phase.

33. The method of claim 19 further comprising:

serving a user not in a direction of the relay stations in the $j^{th}$ group in the cell A or not in a direction of the relay stations in the $k^{th}$ group in the cell B but having the LOS condition to the base station in the cell A or in the cell B at a transmission power level low enough to keep the interference caused by the base station in the relay stations within a threshold during the $i^{th}$ phase.

34. The method of claim 19 further comprising:

in the cell A, performing a third downlink transmission from the base station to the relay stations in the $j^{th}$ group during the $i^{th}$ phase;

in the cell A, performing a third uplink transmission from the relay stations in the $j^{th}$ group to the base station during the $i^{th}$ phase;

in the cell B, performing a forth downlink transmission from the base station to the relay stations in the $k^{th}$ group during the $i^{th}$ phase; and in the cell B, performing a forth uplink transmission from the relay stations in the $k^{th}$ group to the base station during the $i^{th}$ phase.

35. The method of claim 19 further comprising:

in the cell A, performing a fifth downlink transmission from the relay stations not in the $j^{th}$ group to a fifth user within the service areas of the relay stations not in the $j^{th}$ group during the $i^{th}$ phase;

in the cell A, performing a fifth uplink transmission from the fifth user within the service areas of the relay stations not in the $j^{th}$ group to the relay stations not in the $j^{th}$ group during the $i^{th}$ phase;

in the cell B, performing a sixth downlink transmission from the relay stations not in the $k^{th}$ group to a sixth user within the service areas of the relay stations not in the $k^{th}$ group during the $i^{th}$ phase; and in the cell B, performing a sixth uplink transmission from the sixth user within the service areas of the relay stations not in the $k^{th}$ group to the relay stations not in the $k^{th}$ group during the $i^{th}$ phase.

36. The method of claim 19, wherein at least one of the first user or the second user includes at least one of a mobile communication apparatus, a mobile phone or a radio terminal reception equipment.

37. A system for reusing radio resources, the system comprising:

at least one relay station; and at least one base station capable of separating the relay stations into N groups based on the intensity of a potential interference level between one of the at least one base station and each of the relay stations, N being a natural number;

wherein the one base station divides a service period into N phases, wherein N is the number of groups of the relay stations; and wherein the one base station serves the relay stations in the $j^{th}$ group during the $i^{th}$ phase, wherein $1 \leq i, j \leq N$; and the relay stations not in the $j^{th}$ group serve users within the service areas of the relay stations not in the $j^{th}$ group during the $i^{th}$ phase.

38. The system of claim 37, wherein the relay stations are deployed to have the LOS condition to the one base station.

39. The system of claim 37, wherein the relay stations are deployed within the service area of the one base station.

40. The system of claim 37, wherein the relay stations serve users without the LOS condition to the one base station.

41. The system of claim 37, wherein the relay stations serve users having better link quality to link to the relay stations than link to the one base station.

42. The system of claim 37, wherein the one base station determines a scheduling order of the groups.

43. The system of claim 37, wherein two of the relay stations include the intensity of the potential interference level beyond an interference threshold are separated into different groups.

44. The system of claim 37, wherein two of the relay stations are separated into different groups if a transmission target for one of the two relay stations to transmit data to is the other one of the two relay stations and the transmission target is not capable of receiving and transmitting the data at the same time.

45. The system of claim 37, wherein the one base station serves users in a direction of the relay stations in the $j^{th}$ group during the $i^{th}$ phase.

46. The system of claim 45, wherein the one base station performs a downlink transmission to users in the direction of the relay stations in the $j^{th}$ group during the $i^{th}$ phase, and the users in the direction of the relay stations in the $j^{th}$ group perform an uplink transmission to the one base station during the $i^{th}$ phase.

47. The system of claim 37, wherein the one base station serves users not in a direction of the relay stations in the $j^{th}$ group but having the LOS condition to the base station at a transmission power level low enough to keep the interference caused by the one base station in the relay stations within a threshold during the $i^{th}$ phase.

48. The system of claim 37, wherein the one base station performs a downlink transmission to the relay stations in the $j^{th}$ group during the $i^{th}$ phase, and the relay stations in the $j^{th}$ group perform an uplink transmission to the one base station during the $i^{th}$ phase.

49. The system of claim 37, wherein the relay stations not in the $j^{th}$ group perform a downlink transmission to users within the service areas of the relay stations not in the $j^{th}$ group during the $i^{th}$ phase, and users within the service areas of the relay stations not in the $j^{th}$ group perform an uplink transmission to the relay stations not in the $j^{th}$ group during the $i^{th}$ phase.

50. The system of claim 37, wherein the users include at least one of a mobile communication apparatus, a mobile phone or a radio terminal reception equipment.

* * * * *